Sept. 27, 1932.   E. M. MUELLER   1,879,412
SIGHTING DEVICE
Original Filed March 14, 1929    3 Sheets-Sheet 1

INVENTOR
Emil M. Mueller
BY
his ATTORNEY

Sept. 27, 1932. E. M. MUELLER 1,879,412
SIGHTING DEVICE
Original Filed March 14, 1929 3 Sheets-Sheet 2
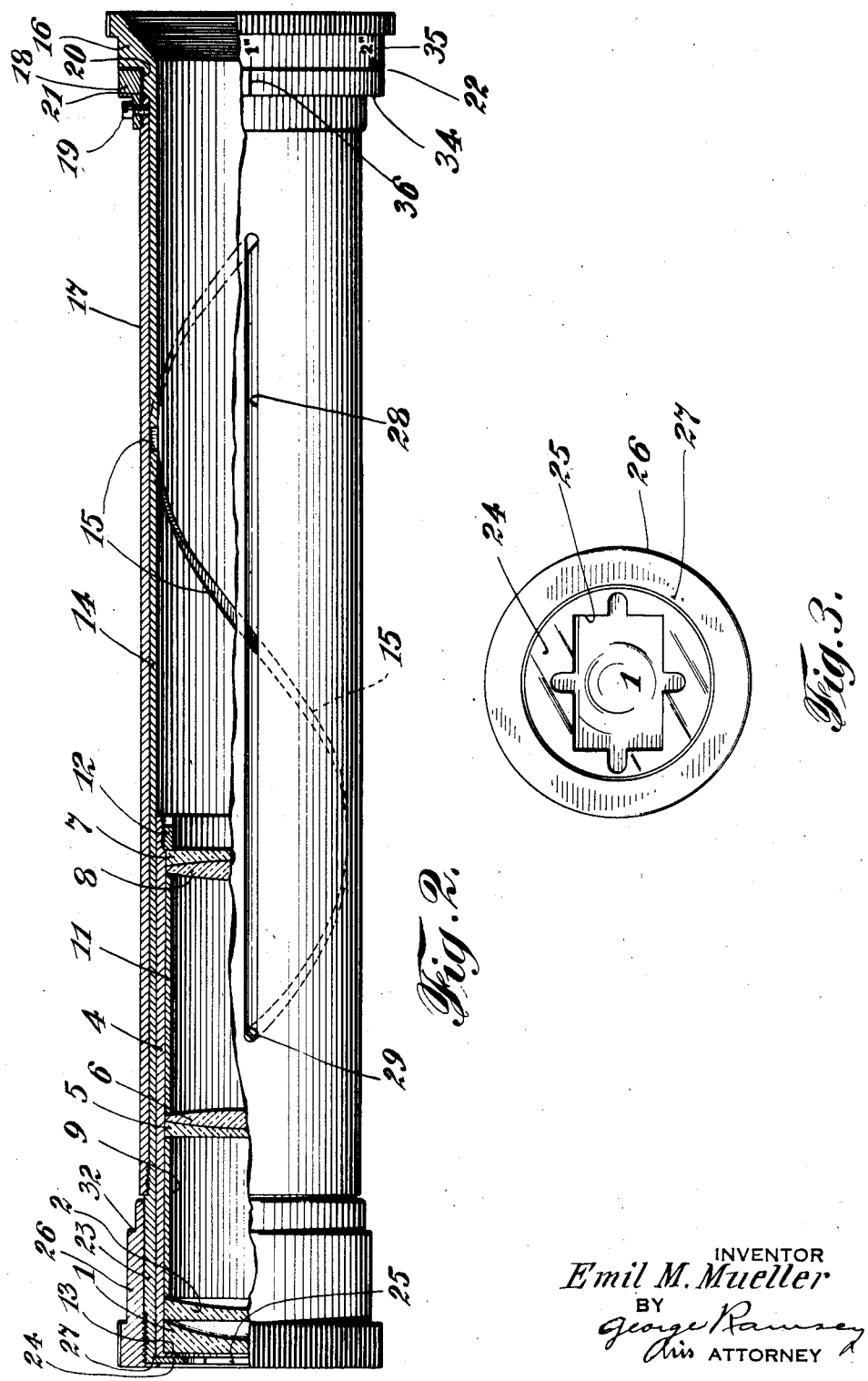
INVENTOR
Emil M. Mueller
BY
George Ramsey
his ATTORNEY Sept. 27, 1932.  E. M. MUELLER  1,879,412
SIGHTING DEVICE
Original Filed March 14, 1929   3 Sheets-Sheet 3
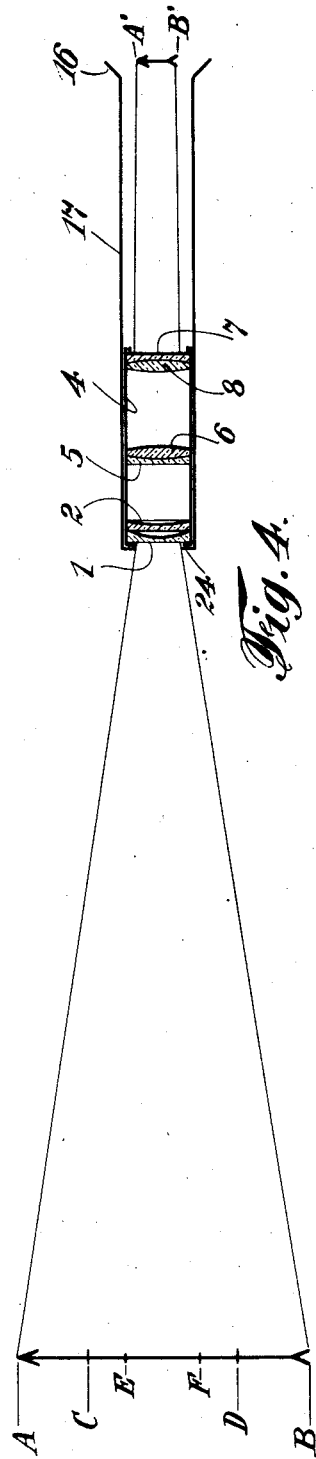
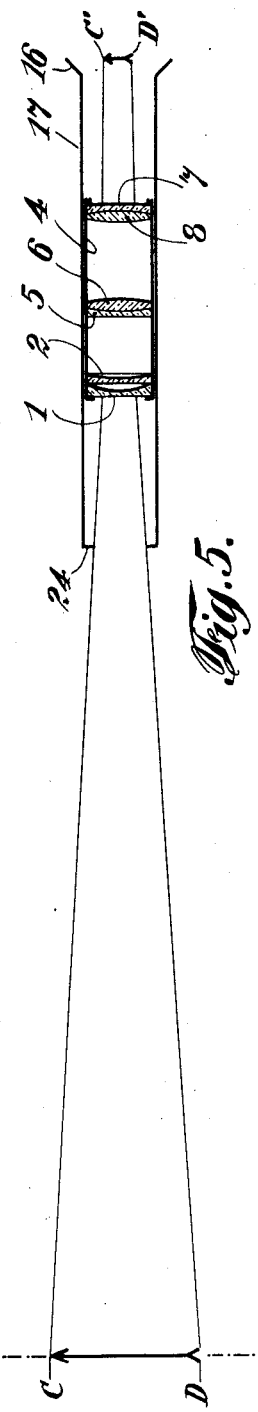
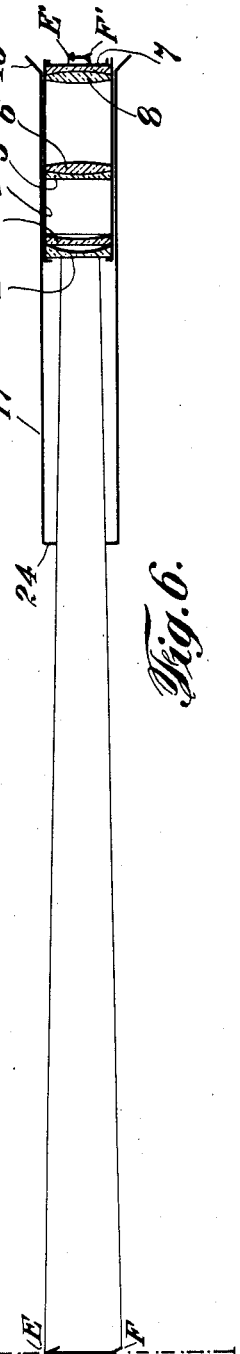
INVENTOR
*Emil M. Mueller*
BY
*George Ramsey*
his ATTORNEY Patented Sept. 27, 1932

1,879,412

UNITED STATES PATENT OFFICE

EMIL M. MUELLER, OF NEW YORK, N. Y., ASSIGNOR TO C. P. GOERZ AMERICAN OPTICAL COMPANY, OF NEW YORK, N. Y., A CORPORATION OF NEW YORK

SIGHTING DEVICE

Application filed March 14, 1929, Serial No. 346,888. Renewed July 19, 1932.

The present invention relates broadly to optics and more especially to a sighting device adapted more particularly for optically determining the width and height of a field at a given distance from the observer.

It is common practice in the use of a moving picture camera to change the lens being used in order to change the size of the image of the object being photographed on the film. The lens commonly in use is usually referred to as the normal lens with lenses of shorter focus designated as wide angle lenses and lenses of longer focus being referred to as telephoto lenses. It is especially desirable that the operator shall at all times know with a fair degree of accuracy the width and height of the field being covered by the particular lens in use. To this end, one method in common use is to provide view finder lenses which are matched to a particular camera lens and then change the view finder lenses each time that the camera lens is changed. Amateur moving pictures are especially associated with some moving object, that is, the camera is usually in use during some incident involving motion. A change from one camera lens to another therefore is most frequently done very quickly in order that as much of the fleeting incident may be recorded as is possible. The additional time necessary to change the view finder lenses as well as the camera lens often is not available and the operator takes a chance on using a view finder which is not matched with the lens. This is exceedingly undesirable because the true field of the lens cannot be determined.

The present invention overcomes the difficulties of the prior art by providing an optical system comprising movable lenses associated with an aperture in an aperture plate and with the system so constructed that the area of the field visible to the operator is dependent upon the relative position between the aperture and the lens system. The instrument is mounted in a barrel or a cylinder with an adjustment scale thereon which is graduated in accordance with the focal length of camera lenses so that, for example, if a one inch focus lens is in use on the camera, and the sighting device is set at "1" on the sighting device scale, the field viewed by the operator through the sighting device will be exactly of the same area as the field covered by the image on the film through the camera lens; whereas if a two inch focus lens is used in the camera, and the sighting device is set with the indicator at "2", the field as viewed by the operator through the sighting device corresponds to the area covered by the image projected on the film through the two inch lens. This relationship between focal lengths of lenses and points on the scale of the sighting device may be carried out to the practical limits of camera lenses and of the sighting device construction.

While the invention is being described more especially with reference to its use in connection with cameras, it is to be understood that the device is primarily an adjustable optical measuring device and may be useful in connection with many other arts, and, furthermore, the invention may be embodied in structures other than those specifically disclosed herewith. Therefore, this disclosure is intended to be that of the preferred form of the invention in accordance with the requirements of the patent laws, but is not to be understood in the limiting sense.

Other and further objects of the present invention will in part be obvious and will in part be pointed out hereinafter by reference to the accompanying drawings, throughout which like characters are used to indicate like parts.

Fig. 2 is a longitudinal view of the device showing one-half thereof in section.

Fig. 3 is an end view of the front of the device.

Figs. 4, 5, and 6 are diagrammatic views illustrating different positions of the lens barrel with reference to the aperture opening at the front of the device.

Figure 1:
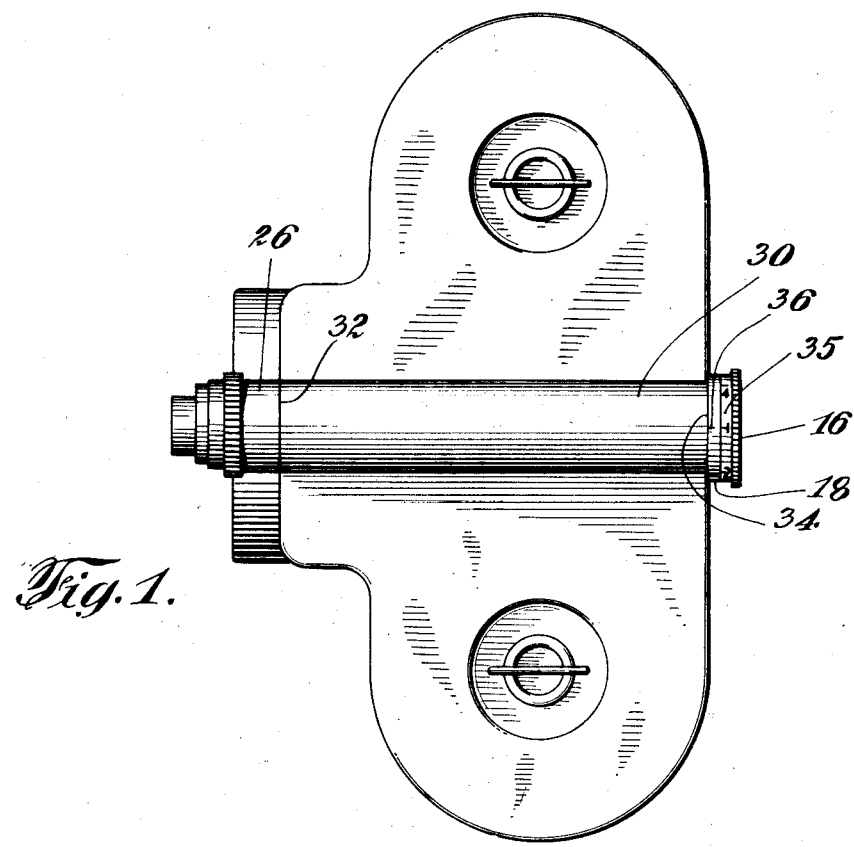
Fig. 1 illustrates the invention as applied to a moving picture amateur camera known in the art as "Filmo".
Figure 7:
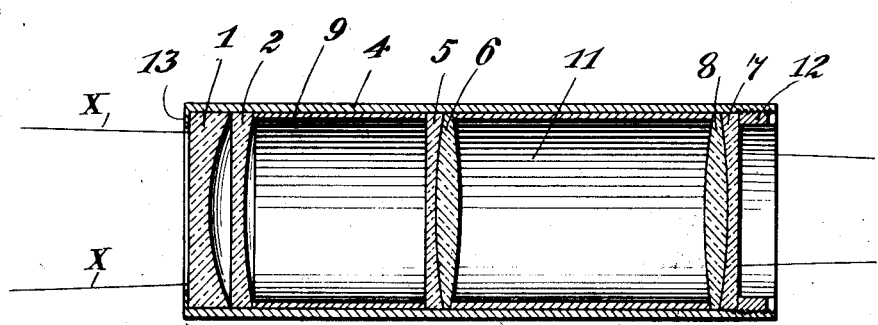

Fig. 7 is a view illustrating the optical system of a preferred form of the invention.

Referring now to the drawings and more especially to Fig. 2, which shows the preferred form of the present invention, the objective lens comprises a front objective lens 1 and a second objective lens 2. In the present invention, the front objective lens 1 is ground with a plano-front surface and with a concave back surface ground on a relative short radius. The second objective 2 has a front plano-surface and a concave back surface ground on a radius slightly longer than the radius for the lens 1. These objective lenses are mounted in a sliding lens tube 4 which also carries an achromatic lens system, the first of which is formed of a flint glass lens 5 and a crown glass lens 6 and the second lens of the achromatic system comprises a flint glass 7 and a crown glass 8. This achromatic system is a magnifying device and the magnifying power may be determined by the particular use for which the sighting device is intended. A separation tube or ring 9 is placed between the second objective lens and the flint glass 5 of the first achromatic lens. A second separation tube or ring 11 is placed between the crown glass 6 of the first achromatic lens and the crown glass 8 of the second achromatic lens. A retaining or clamping ring 12 is screw threaded into the sliding lens tube 4 at the rear end while the front end of the sliding lens tube 4 is provided with a shoulder 13 so that by tightening the clamping ring 12, the lens system is securely mounted in the sliding tube 4. Preferably, the units of each achromatic lens are cemented together with suitable optical cement such as balsam cement.

A rotating inner tube 14 comprises a portion of a guideway for the sliding lens tube 4. This rotating inner tube is provided with a spiral slot 15. The rear end of the rotating tube 14 carries an eye piece 16, which is merely an open member without any lens in it. A stationary outer tube 17 carries a stationary ring 18 which may be screw threaded on the outer tube and attached thereto by means of a screw 19 or other convenient securing means to insure that the stationary ring 18 is held solidly on the outer tube 17. The rotating eye piece 16 is provided with screw threads 20 which engage screw threads 21 in stationary ring 18. This prevents the rotating tube 14 from being disengaged from the stationary tube 17. There is a slight space at 22 between the stationary ring 18 and eye piece 16. This insures ample space to allow for the necessary rotation to the tube 14. The front end of the outer tube 14 preferably carries an intermediate collar 23 which carries at its front end an aperture plate 24. This aperture plate 24 preferably is provided with a substantially rectangular opening 25 (see Fig. 3) which defines the limit of the field being viewed. The intermediate collar 23 is preferably screw threaded to the outer stationary tube 17 in such manner as to comprise an extension of said outer tube. A cap member or screw clamp 26 is preferably screw threaded over the intermediate collar 23 and is provided with an inwardly extending flange 27 which clamps the parts together. The outer stationary tube 17 is provided with a straight longitudinal slot 28 extending full length of the travel intended for the sliding tube 4. A small screw stud 29 extends through the straight slot 28 and also through the spiral slot 15 in the rotating tube and this screw stud 29 is threaded into and attached to the sliding lens tube 4.

It will be observed that by holding the outer tube 17 stationary and by rotating the eye piece 16, that the spiral slot 15 acts as a cam on the screw stud 29 to move this stud in the straight longitudinal slot 28 in the stationary tube, thereby sliding the lens tube 4 longitudinally within the rotating tube 14 to position the lens system at variable distances from the aperture plate 24.

When the device is used with the Filmo camera, the cap member or screw cap 26 is removed and the device is threaded through the sighting tube 30 on the side plate of the camera, then the cap member or screw cap 26 is replaced and tightened down until the shoulder 32 on the screw cap engages the front end of the sighting tube 30 and the shoulder 34 on the stationary ring 18 engages the other end of the sighting tube 30 so that the device is securely locked against movement within the sighting tube 30 of the camera. The eye piece 16 carries scale members 35 and the stationary ring 18 carries a zero line or line of departure 36 which permits the operator to read the scale members 35. Preferably, these scale members 35 are related to the power of the lens system and the opening 25 in the aperture plate so that when the eye piece is rotated to bring a predetermined number on the scale 35 opposite the zero line 36, the field being viewed through the eye piece 16 will correspond to the field being covered by a predetermined lens in the camera. For example, with a lens having a one inch focus in the camera and with the number "1" on the scale 35 opposite the zero line 36, the field viewed through the sighting device will correspond to the field covered by the one inch lens in the camera; and with the number "2" on the scale 35 opposite the zero line 36, the field seen at the eye piece 16 will correspond to the field covered by a two inch lens, etc. In this way, the operator is enabled to see through the sighting device all of the objects that will appear in a picture being taken on the film in the camera through a camera lens designated by the number on the scale 35 which is opposite the zero line 36.

Referring now to Fig. 7, it will be observed that the rays X viewed at the eye piece while converging slightly are so nearly parallel that the position of the lens system relative to the eye piece does not throw the image out of focus. It will also be observed that the relation between the objective lenses and the achromatic enlarging lenses is constant so that these lenses are always in focus. Consequently, the edges of the rectangular opening 25 in the aperture plate are always clear cut and consequently are always in focus. Referring to Figs. 4, 5, and 6 (which illustrate merely the effect produced and is not an attempt to trace the actual optical action of the lens system), it will be noted that as the lens system recedes from the field being viewed, the angularity of the rays of light, as determined by the edges of the rectangular aperture, are diminished, so that with the lens system moved close to the aperture plate, the entire field A—B will be seen at the eye piece as A'—B'. This is the position of the lens system for an adjustment of the eye piece with the number "1" on the scale 35 opposite the zero line 36. If the eye piece is now adjusted to bring the number "2" on the scale 35 opposite the zero line, the lens system will be retraced from the aperture plate 24 as is indicated in Fig. 5 and at this time, the field C—D only, which is a part of the larger field A—B, will be visible at the eye piece as being the image C'—D'. When the eye piece is rotated to bring the number 4 on the scale 35 opposite the zero line 36, the lens system will be retracted nearest to the eye piece and farthest from the aperture plate 24. Under these conditions, only the field E—F of the large field is visible as at E'—F'. In this way, the operator knows that with a one inch lens he will photograph all the objects in the large field A—B, whereas with a four inch lens, his photograph will include only those objects within the small field E—F. It is to be understood, of course, that the pictures being taken on the film are of constant size, and therefore, the objects which are photographed through a four inch lens will be enlarged relative to the objects photographed on a one inch lens, whereas through the sighting device, the size of the objects viewed does not change, but the limit of the field does change so that the operator is advised of the objects which will be included in the photograph.

It will be observed that the scale 35 may be related to things other than camera lenses and that the device may be utilized as a measuring device for determining the area of the field covered under different sighting conditions. The device in its broader aspects comprises a lens system with an aperture opening so that a relative movement between the lens system and the aperture opening cuts down the angularity of rays of light entering the lens system, but maintains the aperture opening clearly defined and in focus for any position of the lens system within the range of the instrument and it is also to be understood that regardless of the adjustment of the lens system relatively to the eye piece that the objective field viewed through the eye piece is always in focus.

Having described my invention, I claim:

1. A sighting device comprising aperture means to frame the field being viewed, a plurality of lenses comprising a negative objective lens and a positive eye piece lens adapted to render rays of light passing through said aperture means and falling upon said objective lens to leave said eye piece lens substantially parallel, said objective lens and said eyepiece lens being relatively immovable, and means for adjusting the relation between said aperture means and said lenses to change the size of the field being viewed through said aperture means.

2. A sighting device comprising an aperture plate provided with an aperture adapted to frame the field being viewed, a plurality of lenses in fixed relation to each other and comprising a negative objective lens and a positive eye piece lens, said lenses being constructed and arranged to cause rays of light falling upon said objective lens to be rendered substantially parallel after passing through said eye piece, and means to vary the distance between said objective lens and said aperture plate to vary the size of the field being viewed.

3. A sighting device comprising an aperture plate provided with an aperture opening, and a lens system movable relative to said aperture opening, said lens system comprising a negative objective lens and a positive eye piece lens with said lenses being at all times in a fixed relation to each other and constructed in such manner that the rays of light leaving the eye piece lens are substantially parallel whereby the limit of field viewed through said aperture opening varies in dimensions relative to the position of the objective lens to said aperture plate.

4. A sighting device comprising an aperture plate provided with an aperture opening, and a lens system movable relative to said aperture opening, said lens system comprising a negative objective lens and a positive eye piece lens with said lenses being at all times in a fixed relation to each other and constructed in such manner that the rays of light leaving the eyepiece lens are substantially parallel whereby the limit of field viewed through said aperture opening varies in dimensions relative to the position of the objective lens to said aperture plate, and means to cause a relative movement between said aperture plate and said lens system.

5. A sighting device for moving picture cameras and the like comprising an aperture plate, an eye piece, a lens system movable relative to said aperture plate, means to move said lens system, said lens system comprising a negative objective lens and a positive viewing lens, said lens system being constructed to vary the size of the field viewed through the eye piece as the lens system is moved to or from said aperture plate, and a scale on said means with the scale graduated to correspond to a focal length of lenses adapted for use in said camera, whereby the field of a predetermined camera lens may be determined by the setting of said scale to a point corresponding to said camera lens.

6. A sighting device for moving picture cameras and the like comprising a camera having a camera lens, a tubular member mounted on said camera with the axis of the tubular member parallel to the axis of the camera lens, said tubular member carrying an aperture plate, an eye piece, a lens system movable relative to said aperture plate, said lens system comprising a negative objective lens and a positive viewing lens in fixed relation, said lens system being constructed to vary the size of the field viewed through the eye piece as the lens system is moved to or from said aperture plate, and a scale graduated to correspond to a focal length of lenses adapted for use in said camera, means to move said lens system and set said scale whereby the field of a predetermined camera lens may be determined by the setting of said scale to a point corresponding to said camera lens.

7. An adjustable view finder for moving picture cameras adapted to use lenses of different local length, said finder comprising a finder lens tube provided with a negative objective lens and a positive eyepiece lens, rotatable means for changing the limits of the boundary of the visual field through said finder without changing the magnification of said field, an index scale on said rotatable means to designate boundaries of the fields of different focal length lenses adapted for use in said camera, whereby the limits of a field of a predetermined camera lens may be visualized in said view finder by rotating said means to set said scale to the index designating the corresponding focal length of said camera lens.

EMIL M. MUELLER.